Patented Feb. 18, 1941

2,232,248

UNITED STATES PATENT OFFICE 2,232,248

PROCESS OF DRYING WHEY

Charles O. Lavett, Buffalo, N. Y., assignor to Buffalo Foundry & Machine Co., Buffalo, N. Y., a corporation of New York No Drawing. Application March 5, 1938,
Serial No. 194,166

10 Claims. (Cl. 99—57)

This invention relates to a process of drying whey and more particularly to the control of the acidity of the various types of whey in concentrating or drying the whey. It is particularly useful where the concentration or drying is done on a revolving heated drum surface in accordance with my copending applications for drying solutions containing lactose, Ser. Nos. 45,090, now Patent No. 2,172,393, issued September 12, 1939, and 45,091, filed October 15, 1935; Ser. No. 152,616, filed July 8, 1937, now Patent No. 2,188,907, issued February 6, 1940, and Ser. No. 194,167 filed March 5, 1938, now Patent No. 2,197,804, issued April 23, 1940.

This application is a continuation in part of my said copending application Ser. No. 152,616, filed July 8, 1937.

When preconcentrated whey is subjected to further concentration or drying on the surface of a revolving, internally heated drum there is a considerable difference in behavior of whey from different sources and made by different processes. These variations have a pronounced effect on the rate at which concentrating or drying can be carried on and hence the capacity of the drum as well as on the color of the product. Certain types of whey are more sensitive to heat and more easily darkened in color during the concentrating or drying process than other kinds.

Whey is a byproduct in the manufacture of casein from skim milk or in the production of cheese from whole or skim milk, and contains those constituents of milk which have not been removed together with the fat and casein of the original milk. The most important ingredients of whey are lactose, proteins and mineral and other salts. Depending on the process of manufacture from which whey is obtained as a byproduct, the amount and composition of the salts, contained in the whey, varies. There also is a considerable variation in titratable acidity of whey from different sources and in the nature of this acidity.

Casein generally is considered to be present in milk in combination with calcium and to hold a certain amount of calcium phosphate with it in suspension. When the casein is coagulated by means of rennet, as in the manufacture of many kinds of cheese and of rennet casein, most or all of the calcium originally combined with the casein and of the calcium phosphate held in suspension therewith, is removed from the milk together with the casein. Whey from these processes, known as cheese whey and rennet casein whey, therefore contains less calcium and less calcium phosphate than the original milk from which the whey is obtained. This type of whey is low in acidity while in a freshly prepared state.

In other processes for the manufacture of casein coagulation of the casein is obtained by the addition of a certain amount of acid to the skim milk and heating of the milk to a temperature suitable for coagulation. In these processes the combination between the calcium and the casein is severed and most or all of the calcium phosphate held in suspension is brought into solution. The whey from these processes consequently contains most or all of the calcium and phosphates contained in the original milk, except for such quantities as are mechanically occluded by or precipitated with the coagulated casein. Such whey also has a considerable titratable acidity. Depending on the nature of the acid used, whether sulfuric, hydrochloric, or acetic acid, this type of whey is known as sulfuric acid casein whey, hydrochloric or muriatic acid casein whey or acetic acid casein whey, and contains such other constituents as are introduced with these acids. In case of sulfuric acid calcium sulfate is formed, part of which is precipitated with the coagulated casein on account of its limited solubility.

The acidity required for coagulation of the casein may also be developed in the milk by lactic acid fermentation, as in the manufacture of lactic acid casein and of cottage cheese. Such fermentation is conducted by well known methods, during which lactic acid is formed from part of the lactose in the milk. Whey from these processes, known as lactic acid casein whey and cottage cheese whey, contains most or all of the calcium and calcium phosphate of the original milk and has a considerable titratable acidity compared to the original milk. In addition this whey also contains such products as may be produced in the fermentation process and are soluble in the whey. On account of the conversion of part of the lactose into lactic acid the relative proportion of lactose to other ingredients in this kind of whey is less than in whey made from the same milk by the other methods previously described.

It will therefore be seen that whey produced by present commercial processes can be classified in three types, namely (1) rennet casein and cheese whey—low in phosphates and calcium and low in acid; (2) sulfuric, hydrochloric and acetic acid casein whey—high in phosphates and calcium, high in acid and high in lactose and (3) cottage cheese and lactic acid casein whey—high in phosphates and calcium, high in acid and low in lactose.

It is one of the objects of this invention to accelerate the rate of concentrating or drying whey by increasing the temperature of the heating medium without affecting the color of the product, and decrease the time required for concentrating or drying whey on the surface of an internally heated drum by first adjusting the acidity of the raw whey to from .25 to .45%, preferably from .25 to .40% and particularly, in the case of cheese and rennet whey, by increasing the acidity of the whey.

Another object is to so improve the concentrating or drying properties of the whey preferably by adding sulfuric acid, sulfuric acid having been found to have a specific favorable influence in drum concentrating or drying casein, and cheese and rennet whey.

Another object is to so improve the concentrating and drying properties of cottage cheese and lactic acid casein whey by first partially neutralizing the raw whey and thereafter adding sulfuric acid to adjust its acidity to from .25 to .45%, thereby to secure the favorable influence of sulfuric acid without creating a condition of excessive acidity.

Another object is to so improve the concentrating and drying properties of cottage cheese and lactic acid casein whey by the addition of sodium bisulfite after partial neutralization of the raw whey.

The temperature to which the whey, after preconcentration, can be heated during the further concentrating or drying process on a heated drum and the time during which it can be kept at this temperature without material discoloration, affect the drying or concentrating conditions for each kind of whey, such as the pressure of the steam which can be used for heating the drum and the speed at which the drum can be revolved, and thereby affect also the concentrating and drying rate and capacity of the drum. For this reason it is desirable to modify the condition of the whey to decrease its sensitivity to heat, provided this can be done at little expense and without diminishing the value of the product or injuring its quality. Since the drying processes also involve the simultaneous crystallization of the lactose and solidification of the whey, preferably on a surface seeded with lactose crystals provided by incompletely removing the dried product, it is important to have this crystallization take place as completely and quickly as possible. In case of insufficient crystallization the product, although low in moisture content when removed from the drum surface, may cake in storage, while in case of retarded crystallization drying conditions have to be modified to provide sufficient time for such crystallization as is necessary or desirable. In this respect cottage cheese whey and lactic acid whey are particularly troublesome. Cheese and rennet whey, which are low in acidity when fresh, readily sour by lactic acid fermentation in storage, and then become as difficult to handle as cottage cheese whey.

I have found that the concentrating or drying rate, rate of crystallization of the lactose and color of the dry product can be greatly improved by regulating or controlling the acidity of the whey, within certain limits, previous to drying. Where casein has been prepared by addition of acid to skim milk, the whey may contain between .25% and .60% of acid, and generally be .35% and .45%, as determined by the customary method of titration with alkali, the acidity being calculated as lactic acid. Other kinds of whey will vary in acidity, in the same terms, between .10% and .70% depending on the amount of souring which has taken place before or after separation of the casein or cheese.

Sulfuric acid casein whey can be dried on a drum without difficulty within a range in acidity of .30% to .60%, but I have found that the best capacity of the dryer is obtained within a range of .35% to .45%. Best results and highest capacities with hydrochloric or muriatic acid whey are obtained within a range of .30% to .45%. When outside these favorable ranges I have found it desirable to increase the acidity by adding additional acid in case the acidity is low, or reduce the acidity, preferably by means of lime, if it is high, thereby increasing the capacity of the dryer as much as 15% by suitable increase in acidity, drum speed and steam pressure.

Rennet casein and cheese whey, when fresh, generally contain .08% to .15% acid and can be dried in this condition. By an increase in acidity to .25% to .40% and more particularly to the range of .25% to .35% increases in dryer capacity as high as 34% have been obtained on rennet whey. For the purpose of increasing this acidity I have found sulfuric acid to be preferable and to have a specific influence compared to other acids, such as hydrochloric and phosphoric acid, in that sulfuric acid produces a lighter colored product and more favorably affects the crystallization of the lactose during the drying process.

Cottage cheese whey and lactic acid casein whey may vary in acidity from .25% to .70% and there is a considerable difference between these and other kinds of whey with regard to their behavior in drying. They are more sensitive to heat and discolor more readily, probably because of the souring or fermentation process in which they are produced. During the process of fermentation or souring, some of the lactose is converted into lactic acid, resulting in a reduction of the lactose content of the whey and probably other changes, at present little understood, take place which retard the crystallization of the lactose and thereby reduce the rate of drying. As an illustration of the sensitiveness of cottage cheese whey to heat, if a small amount of whey is concentrated to a semi-solid state and allowed to accumulate at a temperature of about 200° F., the heat stored in the material will be sufficient to turn the interior of the accumulated product from a straw color to a red brick color. With acidities up to approximately .35%, lactic acid casein wheys can be readily dried to provide a product having a light color, but at higher acidities become sensitive to heat and discolor readily and the rate of drying drops very rapidly.

With cottage cheese and lactic acid casein whey, I have found that a stable product of good color and much less sensitive to head can be obtained, at the same time increasing the drying rate as much as 40%. To accomplish this I first partly neutralize the whey, preferably by means of lime. I then add a small amount of sodium bisulfite. The additions can be made either to the raw whey before concentrating or to the concentrated whey before drying. In adding lime the acidity should be reduced to between .30% and .45%, preferably to approximately .40%. The amount of bisulfite added need not be more than one and one-half percent of the amount of solids contained in the whey. Partial reduction of acidity to .15% to .25% followed by an increase in acidity by means of sulfuric acid to .30% to .45% also gives improved results in drying but is less effective than the addition of sodium bisulfite.

In concentrating whey, after preconcentration to 30–50% solids, on a revolving heated drum surface in the range of 50–92% solids, without crystallization of any of the lactose, as part of the processes described in my copending applications, Ser. Nos. 45,090, 45,091, 152,616 and 194,167, acidity control is also of great benefit for whey of high acidity. When such whey passes through the preheater described in my copending application Ser. No. 179,403, filed Dec. 13, 1937, now Patent No. 2,188,908, issued February 6, 1940, for Process and apparatus for coagulating proteins in liquor, the coagulation of albumen is less complete than for whey containing .30–.45% titratable acid. Any uncoagulated whey may then coagulate during concentration on such a revolving heated drum surface. Such coagulation may interfere with proper concentration and frequently causes the coagulated whey to form particles of considerable size or collect in patches which often do not properly adhere to the drum surfaces.

Wherever reference is made to acidity or titratable acidity this is understood to mean the amount of acid equivalent to the amount of sodium hydroxide necessary for complete neutralization of the whey using phenolphthalein as an indicator and calculating the acidity in terms of percent lactic acid.

It will also be understood that the additions of acid, lime or sodium bisulfite can be made either to the raw whey or to preconcentrated whey before concentration or drying on the drum as set forth. To prevent whey from souring, if held for any length of time before preconcentration, it is also desirable to heat the whey to a suitable temperature and hold it at such temperature.

From the foregoing it will be seen that the present invention, by acidity control within the limits set forth, provides a method of improving the concentrating and drying properties of whey particularly when concentrated or dried on internally heated drums and by said acidity control, in combination with the use of sulfuric acid, and in combination with the use of sodium bisulfite further improves the concentrating properties of the whey under the conditions set forth.

I claim as my invention:

1. The method of drying whey which comprises adjusting the titratable acid content of the whey to from .25% to .45%, calculated as lactic acid, and concentrating and drying said adjusted whey.

2. The method of drying whey which comprises preconcentrating the whey, adjusting the acidity of the preconcentrated whey to the equivalent of from .25% to .45% acid based on the raw whey and thereafter further concentrating and drying said adjusted whey.

3. The method of drying whey which comprises adjusting the titratable acid content of the whey to from .25% to .45%, calculated as lactic acid, spreading said whey in the form of a layer on a heated surface to concentrate the same and drying said concentrated whey.

4. The method of drying whey which comprises adjusting the titratable acid content of the whey to from .25% to .45%, calculated as lactic acid, preconcentrating said whey, spreading said preconcentrated whey in the form of a layer on a heated surface to concentrate the same and drying said concentrated whey.

5. The method of drying whey which comprises adjusting the titratable acid content of the whey to from .25% to .45%, calculated as lactic acid, preconcentrating said whey, spreading said preconcentrated whey in the form of a layer on a heated surface seeded with lactose crystals and drying said layer on said surface.

6. The method of drying cheese and rennet casein whey which comprises adding acid to the whey to provide a titratable acid content of from .25% to .45%, calculated as lactic acid, spreading said whey in the form of a layer on a heated surface to concentrate the same and drying said concentrated whey.

7. The method of drying cottage cheese and lactic acid casein whey which comprises neutralizing the acid to provide a titratable acid content of less than .20%, calculated as lactic acid, adding sulfuric acid to provide an acid content of from .30% to .45%, calculated as lactic acid, spreading said acidified whey in the form of a layer on a heated surface to concentrate the same and drying said concentrated whey.

8. The method of drying cheese, rennet casein and other casein wheys which comprises adding sulfuric acid to provide a titratable acid content of from .25% to .45%, calculated as lactic acid, spreading said acidified whey in the form of a layer on a heated surface to concentrate the same and drying said concentrated whey.

9. The method of drying cottage cheese whey which consists in partially neutralizing the whey, adding a small amount of sodium bisulfite thereto, spreading said whey as a layer on a heated surface to concentrate the same and drying said concentrated whey.

10. The method of drying cottage cheese whey which comprises neutralizing the acid therein to provide an acid content of from .30% to .45%, calculated as lactic acid, adding sodium bisulfite not in excess of 1.5% of the solids present in the whey, spreading said treated whey as a layer on a heated surface to concentrate the same and drying the concentrated whey.

CHARLES O. LAVETT.